United States Patent
Chesney et al.

(10) Patent No.: US 11,644,384 B2
(45) Date of Patent: May 9, 2023

(54) DEVICE AND METHOD FOR COLD TESTING ENGINE COMPONENT OPERATION

(71) Applicant: Ford Motor Company, Dearborn, MI (US)

(72) Inventors: David J. Chesney, Northville, MI (US); Roderick Alexander Simpson, Windsor (CA)

(73) Assignee: Ford Motor Company, Dearborn, MI (US)

( * ) Notice: Subject to any disclaimer, the term of this patent is extended or adjusted under 35 U.S.C. 154(b) by 537 days.

(21) Appl. No.: 15/984,705

(22) Filed: May 21, 2018

(65) Prior Publication Data

US 2019/0353558 A1    Nov. 21, 2019

(51) Int. Cl.
*G01M 15/09* (2006.01)
*F02D 13/06* (2006.01)
(Continued)

(52) U.S. Cl.
CPC ......... *G01M 15/09* (2013.01); *F01L 13/0005* (2013.01); *F02D 13/06* (2013.01);
(Continued)

(58) Field of Classification Search
CPC ... F02F 1/4214; G01M 15/09; F02D 13/0261; F02D 41/22; F02D 41/222; F01L 13/0005; F01L 2800/18
See application file for complete search history.

(56) References Cited

U.S. PATENT DOCUMENTS

| | | | | |
|---|---|---|---|---|
| 1,722,821 A | * | 7/1929 | Nutt | F01L 1/26 123/90.22 |
| 3,017,872 A | * | 1/1962 | Candelise | F02B 3/00 123/26 |

(Continued)

FOREIGN PATENT DOCUMENTS

| | | | | |
|---|---|---|---|---|
| DE | 4025882 A1 | * | 11/1991 | .......... G01M 15/042 |
| EP | 0536561 A1 | * | 4/1993 | ............ G01M 15/02 |

(Continued)

OTHER PUBLICATIONS

Khurana, A., Pervading Cold Testing of Engines in the Automobile Zone, Applied Mechanics and Materials, vols. 1100-116, pp. 4544-4548, 2012, Trans Tech Publications, Switzerland. Available at URL http://citeseerx.ist.psu.edu/viewdoc/download?doi=10.1.1.1017.3641&rep=rep1&type=pdf.

(Continued)

*Primary Examiner* — Logan M Kraft
*Assistant Examiner* — Joshua Campbell
(74) *Attorney, Agent, or Firm* — Burris Law, PLLC (57) ABSTRACT

A method of determining a condition of a component (e.g., valves) of an engine having a manifold air pressure sensor during a cold test includes providing pressurized air to an intake of the engine. The method includes rotating a crankshaft of the engine. The method includes measuring pressures with the manifold air pressure sensor as a function of crankshaft rotational position. The method includes comparing the pressures with a predetermined baseline. The method includes indicating a condition of the component based on the comparison of the pressures with the baseline.

22 Claims, 4 Drawing Sheets

(51) Int. Cl.
  *F01L 13/00*   (2006.01)
  *F02D 41/00*   (2006.01)
  *F02D 17/02*   (2006.01)

(52) U.S. Cl.
  CPC ......... *F02D 17/02* (2013.01); *F02D 41/0087* (2013.01); *F01L 2013/001* (2013.01); *F01L 2800/14* (2013.01); *F01L 2800/18* (2013.01)

(56) References Cited

U.S. PATENT DOCUMENTS

| | | | | |
|---|---|---|---|---|
| 4,633,707 | A * | 1/1987 | Haddox | G01L 23/08 73/114.16 |
| 5,138,874 | A | 8/1992 | Davis | |
| 5,184,581 | A * | 2/1993 | Aoyama | F01L 1/34406 123/90.31 |
| 5,417,109 | A | 5/1995 | Scourtes | |
| 5,492,006 | A | 2/1996 | Beckett | |
| 5,780,730 | A * | 7/1998 | Scourtes | G01M 15/106 73/114.37 |
| 6,161,384 | A * | 12/2000 | Reinbold | F02B 37/16 60/602 |
| 6,463,795 | B2 | 10/2002 | Kosmehl et al. | |
| 7,314,034 | B1 | 1/2008 | Waters et al. | |
| 7,762,237 | B2 | 7/2010 | Gibson et al. | |
| 7,900,509 | B2 | 3/2011 | Feldkamp et al. | |
| 8,117,904 | B2 | 2/2012 | Chesney et al. | |
| 8,375,920 | B2 | 2/2013 | Tsukamoto et al. | |
| 9,562,470 | B2 | 2/2017 | Younkins et al. | |
| 2008/0035129 | A1 * | 2/2008 | Vangraefschepe | F02D 41/22 123/585 |
| 2010/0242583 | A1 | 9/2010 | Chesney et al. | |
| 2010/0262355 | A1 * | 10/2010 | Bauer | F02D 13/0207 701/103 |
| 2011/0144888 | A1 * | 6/2011 | Rollinger | F02D 41/221 701/103 |
| 2014/0379206 | A1 * | 12/2014 | Martin | F02D 41/042 180/65.265 |
| 2016/0116371 | A1 * | 4/2016 | Chen | F02M 35/1038 73/114.37 |
| 2017/0101956 | A1 | 4/2017 | Younkins et al. | |

FOREIGN PATENT DOCUMENTS

| | | | | |
|---|---|---|---|---|
| EP | 0536561 | B1 * | 12/1996 | ............ G01M 15/02 |
| EP | 0814257 | | 12/1997 | |
| EP | 1426578 | B1 * | 4/2006 | ............. F02B 37/10 |

OTHER PUBLICATIONS

Choosing the Right Pressure Sensors for Engine Test, available at URL https://measurementsensors.honeywell.com/techresources/appnotes/Pages/choosing_pressure_sensors.aspx.

* cited by examiner

DEVICE AND METHOD FOR COLD TESTING ENGINE COMPONENT OPERATION

FIELD

The present disclosure relates to a device and method for cold testing engine component operation.

BACKGROUND

The statements in this section merely provide background information related to the present disclosure and may not constitute prior art.

Some piston-cylinder internal combustion engines, commonly called variable displacement engines, can be operated in a cylinder deactivation mode in which one or more of the cylinders are selectively deactivated. Fuel is typically not provided to the deactivated cylinders. Accordingly, the deactivation of one or more cylinders during situations when less power is required can improve overall fuel efficiency of the vehicle. The deactivated cylinders can then be reactivated when more power is required. In some variable displacement engines, it can be advantageous to have the intake and exhaust valves of the deactivated cylinders remain closed during all strokes of deactivated cylinder until that cylinder is reactivated.

It can be advantageous to test the operation of the engine before installation on the rest of the vehicle, and in a cold state (i.e., without combustion occurring in the engine). However, it can be difficult to accurately test the operation of the deactivation mode and other engine components in the cold state without modifying the engine or involving additional sensors that must be removed before assembling the engine in the finished vehicle.

These issues with cold testing engine components and the deactivated cylinder mode of variable displacement engines without using additional sensors are addressed with the teachings of the present disclosure.

SUMMARY

In one form, a method of determining valve positions for an engine having an air pressure sensor during a cold test includes providing either pressurized air or vacuum to an intake of the engine. The method includes rotating a crankshaft of the engine. The method includes measuring manifold pressures with the pressure sensor as a function of crankshaft rotational position. The method includes comparing the pressures with a predetermined baseline. The method includes indicating valve positions based on the comparison of the pressures with the baseline.

According to a further form, the valve positions are open or closed.

According to a further form, an open valve position is indicated when the measured pressure is less than the baseline pressure at a known crankshaft rotation angle.

According to a further form, a closed valve position or stuck valve position is indicated when the measured pressure is greater than the baseline pressure at a known crankshaft rotation angle.

According to a further form, the engine is a variable displacement engine (VDE).

According to a further form, each cylinder of the engine has 2 intake valves and 2 exhaust valves and the step of indicating the valve positions includes indicating open or closed positions of one or both of the intake and exhaust valves.

According to a further form, a pressurized air is operatively connected to an electronic throttle body (ETB) and the method comprises supplying pressurized air from the pressurized air source to the ETB.

According to a further form, the engine is operated at wide open throttle, with an intake variable cam timing (VCT) and an exhaust VCT operating in a maximum valve overlap condition.

According to a further form, a revolutions per minute (RPM) of the engine is 1000 RPM or less.

According to a further form, a pressurized air source provides air to the engine at 40 psi or less.

According to a further form, the engine comprises a cylinder deactivation mode and the method includes indicating a proper or improper operation of the cylinder deactivation mode based on variations in pressure between the measured pressure and the baseline pressure.

According to a further form, the method includes cycling the cylinder deactivation mode on and off a plurality of times before measuring the pressures and comparing the pressures with the baseline.

In another form, a method of determining a condition of a component of an engine having a manifold air pressure sensor during a cold test includes providing pressurized air to an intake of the engine. The method includes rotating a crankshaft of the engine. The method includes measuring pressures with the pressure sensor as a function of crankshaft rotational position. The method includes comparing the pressures with a predetermined baseline. The method includes indicating a condition of the component based on the comparison of the pressures with the baseline.

According to a further form, the component is a valve and the condition is one of open or closed.

According to a further form, the component is a piston slidably disposed in a cylinder and the condition is play between the piston and the cylinder.

According to a further form, the component is a turbocharger.

According to a further form, a pressurized air source is operatively connected to an electronic throttle body (ETB) to provide the pressurized air to the intake of the engine.

According to a further form, the engine is operated at wide open throttle, with an intake variable cam timing (VCT) and an exhaust VCT operating in a maximum valve overlap condition.

In another form, a method of determining a condition of a component of an engine having a manifold air pressure sensor during a cold test includes operating the engine without combustion occurring in the engine at a crankshaft revolutions per minute (RPM) of 1000 RPM or less. The method includes connecting a supplemental pressurized air source to an intake of the engine. The method includes providing pressurized air at 40 psi or less to the intake from the pressurized air source. The method includes measuring pressures with the pressure sensor as a function of crankshaft rotational position. The method includes comparing measured pressures with a predetermined baseline. The method includes indicating a condition of the component based on the comparison of the measured pressures with the baseline.

According to a further form, each cylinder of the engine has a plurality of intake and exhaust valves. The component is at least one of the intake valves or the exhaust valves, and the condition is open or closed.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
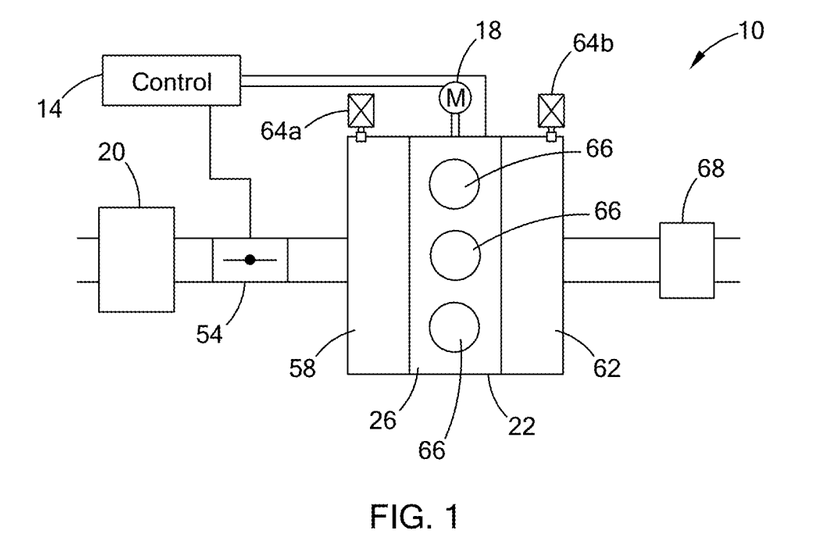
FIG. 1 is a schematic view of an internal combustion engine and a test apparatus in accordance with the teachings of the present disclosure, illustrating the engine having a plurality of combustion cylinders.
Figure 2:
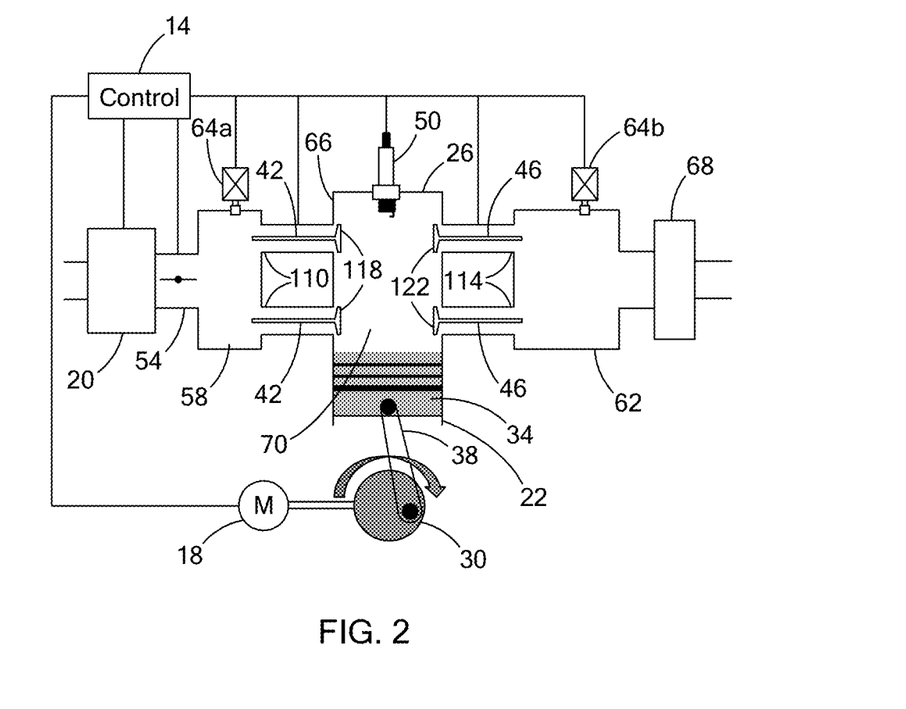
FIG. 2 is a schematic view of a portion of the internal combustion engine and test apparatus of FIG. 1, illustrating one of the combustion cylinders of the engine of FIG. 1.

With reference to FIGS. 1 and 2, an engine 10 is illustrated connected to a test apparatus that includes a control module 14, a motor 18, and air pressure device 20. In one configuration, the air pressure device 20 is a source of pressurized gas, e.g., an air compressor or compressed air tank. In another configuration, the air pressure device 20 is a vacuum source, e.g., a vacuum or suction device. The engine 10 includes an engine block 22, a cylinder head 26, a crankshaft 30, a plurality of pistons 34, a plurality of connecting rods 38, a plurality of intake valves 42, a plurality of exhaust valves 46, a plurality of ignition devices 50, a throttle body 54, an intake manifold 58, an exhaust manifold 62, and a manifold air pressure sensor. The manifold air pressure sensor can be a sensor configured to measure either an air pressure of the intake manifold 58 (e.g., an intake manifold absolute pressure sensor), or an air pressure of the exhaust manifold 62 (e.g., a pressure sensor mounted to the exhaust manifold 62). In the example provided, the engine 10 is illustrated with both an intake manifold pressure sensor 64a and exhaust manifold pressure sensor 64b, though one or the other or both can be used. In the example provided, the engine can also include a turbocharger 68. When a turbocharger 68 is included, the exhaust manifold pressure sensor 64b can be downstream of the turbocharger 68.

In the example provided, the engine block 22 and cylinder head 26 are configured as an engine with three cylinders 66 in an inline configuration, though other numbers of cylinders and configurations can be used (e.g., I-4, V-6, V-8, W-12, flat-4, etc.). Each piston 34 is slidable within a corresponding one of the cylinders 66 so that the piston 34, engine block 22, and cylinder head 26 define a combustion chamber 70. Each piston 34 is coupled to the crankshaft 30 by a corresponding connecting rod 38 in a conventional manner. The crankshaft 30 is rotatably coupled to the engine block 22 and configured so that rotation of the crankshaft 30 relative to the engine block 22 translates the pistons 34 in the cylinders 66 to change the volume of the combustion chamber 70. In the example provided, the engine 10 is a four-stroke engine such that during normal operation of the engine 10, each piston 34 moves through an intake stroke, a compression stroke, a power or combustion stroke, and an exhaust stroke.

The throttle body 54 is connected to the intake manifold 58 and configured to adjust an air flow into the intake manifold 58. In the example provided, the throttle body 54 is a butterfly style throttle body including a throttle plate movable within a housing to adjust airflow through the housing, though other configurations can be used. The throttle body 54 is illustrated in FIG. 2 with the throttle plate in a wide-open position, or full throttle position, in which maximum air-flow is permitted through the throttle body 54. In the example provided, the throttle body 54 is an electrically controlled throttle body, such that the position of the throttle plate is controlled by the control module 14, though other configurations can be used, such as a mechanical throttle body.

The intake manifold 58 is connected to the throttle body 54 and the cylinder head 26 for fluid communication therewith. The intake manifold 58 is configured to receive airflow from the throttle body 54 and to distribute air to each combustion chamber 70 via the intake valves 42. The air pressure device 20 is connected to the throttle body 54 for fluid communication therewith. The exhaust manifold 62 is connected to the cylinder head 26 for fluid communication therewith. The exhaust manifold 62 is configured to receive combustion gasses from the combustion chambers 70 and exhaust the combustion gasses from the engine 10. In the example provided, the turbine of the turbocharger 68 is connected to the exhaust manifold for fluid communication therewith. In an alternative configuration, not specifically shown, the air pressure device 20 can be connected to the outlet of the exhaust manifold 62 or to the outlet of the turbine of the turbocharger 68.

Returning to the example provided, the manifold pressure sensor 64a is mounted to the intake manifold 58 and configured to measure the air pressure within the intake manifold 58. The manifold pressure sensor 64a is in communication with the control module 14 and can send signals indicative of the measured pressure to the control module 14. The manifold pressure sensor 64b is mounted to the exhaust manifold 62 and configured to measure the air pressure within the exhaust manifold 62. The manifold pressure sensor 64b is in communication with the control module 14 and can send signals indicative of the measured pressure to the control module 14.

In the example provided, the cylinder head 26 defines a pair of intake valve apertures 110 and a pair of exhaust valve apertures 114 for each combustion chamber 70, though other numbers of intake and exhaust apertures per combustion chamber 70 can be used. Each intake valve 42 corresponds to one of the intake apertures 110. Each intake valve 42 is operable in an open state, in which a valve member 118 of the intake valve 42 permits airflow from the intake manifold 58 into the combustion chamber 70, and a closed state, in which the valve member 118 inhibits airflow from the intake manifold 58 to the combustion chamber 70. Each exhaust valve 46 corresponds to one of the exhaust apertures 114. Each exhaust valve 46 is operable in an open state, in which a valve member 122 of the exhaust valve 46 permits airflow from the combustion chamber 70 to the exhaust manifold 62, and a closed state in which the valve member 122 inhibits airflow from the combustion chamber 70 to the exhaust manifold 62.

In the example provided, the intake valves 42 and exhaust valves 46 are changed from their open to closed state by camshafts (not shown), though other configurations can be used (e.g., solenoid actuated valves). In the example provided, the camshafts (not shown) are drivingly coupled to the crankshaft 30 so that rotation of the crankshaft 30 can cause rotation of the camshafts (not shown). The camshafts (not shown) have cam surfaces or lobes that engage roller finger followers (not shown) that are configured to move the valve members 118, 122 relative to the cylinder head 26. In the example provided, the followers (not shown) are deactivatable and configured to be selectively operated in a first state wherein the followers can move the corresponding valve member 118 or 122 based on the cam position, and in a second state wherein the follower does not move the corresponding valve member 118 or 122 regardless of the cam position. In an alternative configuration, not specifically shown, other means of opening and closing the valves can be used, such as push rods for example.

Returning to the example provided, during normal engine operation, the intake valves 42 for a particular cylinder 66 are generally open during the intake stroke of that cylinder 66, but are generally closed during the compression, power, and exhaust strokes. During normal engine operation, fuel is injected by a fuel injector (not shown) into the cylinders during the intake stroke and/or the compression stroke. During normal engine operation, the exhaust valves 46 for a particular cylinder 66 are generally open during the exhaust stroke, but are generally closed during the intake, compression, and power strokes. It is understood that the timings of the opening and closing of the intake valves 42 and exhaust valves 46 described herein is only referring to the general nature of their opening or closing for a particular stroke of the engine, and does not mean that the intake valves 42 need to be open during the entire intake stroke, or closed during the entire exhaust or compression stroke, nor does it mean that the exhaust valves 46 need to be closed during the entire intake or power stroke, or open during the entire exhaust stroke. It is also understood that the timing of the opening and closing of the valves 42, 46 can be controlled and changed by the control module 14 or a variable valve timing system (not shown) and that in some situations, the open condition of the intake and exhaust valves 42, 46 can overlap. In the example provided, the control module 14 can control and adjust the timing of the opening and closing of the valves 42, 46 and can selectively deactivate the opening of the valves 42, 46.

In order to reduce fuel consumption, the engine 10 is configured to be selectively operated in a cylinder deactivation mode, such that at least one cylinder 66 is deactivated to not produce power, while the other, active cylinders 66 operate as normal to continue to produce power. In the example provided, the engine is configured so that a predetermined set one of the three cylinders 66 can be deactivated. In other configurations, not shown, the cylinder 66 that is deactivated can change (e.g., the different cylinders 66 can take turns being deactivated). In other configurations, not shown, more than one cylinder can be deactivated (e.g., two or more cylinders of a V8 engine can be deactivated).

During the cylinder deactivation mode, the intake valves 42 and exhaust valves 46 of the deactivated cylinder 66 are deactivated by the control module 14 so that they remain closed during all strokes for that cylinder until the cylinder is reactivated. In the example provided, when deactivation of the cylinder 66 is desired, the followers (not shown) for the intake valves 42 and the exhaust valves 46 no longer transmit motion from the cams (not shown) to the valve members 118, 122 of that deactivated cylinder 66. The intake valves 42 and exhaust valves 46 are normally closed valves, such that the lack of actuation from the cams (not shown) results in the intake and exhaust valves 42, 46 for the deactivated cylinder remaining closed during deactivation mode.

Each ignition device 50 is mounted to the cylinder head 26 so that an ignition portion of the ignition device is positioned to cause ignition of compressed air-fuel mixture in the combustion chamber 70. In the example provided, the ignition device 50 is a spark plug having an electrode and a ground strap spaced apart from the electrode to form a spark plug gap. The spark plug ignition device 50 is configured to produce a spark between the electrode and the ground strap within the combustion chamber 70 when power is supplied to the electrode at a predetermined voltage across the spark plug gap.

The motor 18 is an electric motor drivingly connected to the crankshaft 30 so that activation of the motor 18 rotates the crankshaft 30 to translate the pistons 34 in the cylinders 66.

The control module 14 is configured to control operation of the motor 18, the air pressure device 20, the intake valves 42, the exhaust valves 46, the ignition devices 50, the throttle body 54 and the manifold pressure sensors 64a, 64b. The control module 14 is configured to cold test the operation of the valves 42, 46 and the deactivation mode. In other words, the control module 14 is configured to ensure that the valves 42, 46 and deactivation mode are properly functioning without combustion occurring in the engine 10.

Figure 3:
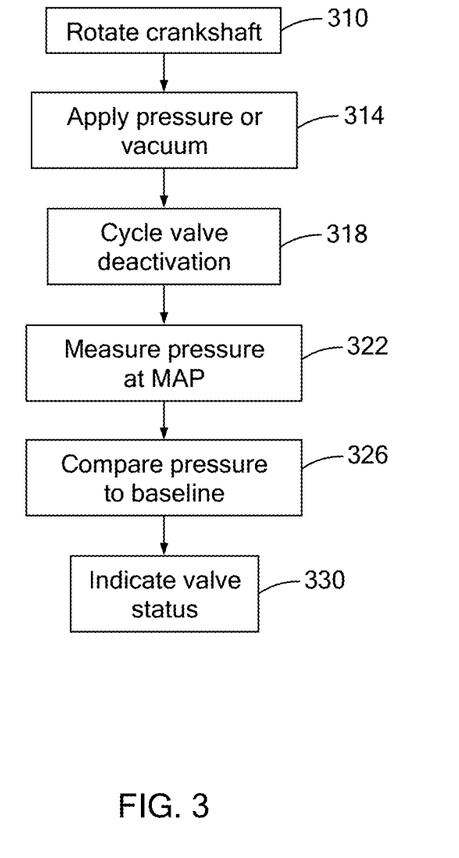
FIG. 3 is a flow chart of a method of testing a deactivation mode of the engine of FIGS. 1 and 2.

With continued reference to FIG. 2 and additional reference to FIG. 3, a method of testing the valves 42, 46 and the deactivation mode of the engine 10 is illustrated in flow chart form. In the example provided, the throttle body 54 is maintained in the wide-open or full throttle position and the intake variable cam timing (VCT) and exhaust VCT are operated in a maximum valve overlap condition that allows maximum flow through the engine (e.g., where the intake VCT is fully advanced and the exhaust VCT is fully retarded) while performing the test of the method, though other conditions can be used. At step 310, the control module 14 activates the motor 18 to rotate the crankshaft 30 at a predetermined rotational speed. In the example provided, the crankshaft 30 is rotated at a relatively low rotational speed (e.g., less than 1,000 RPM), though other configurations can be used. In one configuration, the crankshaft 30 is rotated at approximately 120 RPM, though other speeds can be used. While discussed with reference to speeds of less than 1,000 RPM, the method can be performed at speeds greater than 1,000 RPM. However, lower speeds can provide more time for the valve overlap condition which can provide greater air flow through the engine 10 and improved measurement accuracy. In one alternative example, the air pressure device 20 is a vacuum source configured to draw air through the engine 10 via suction. The method can proceed to step 314 with the crankshaft 30 rotating, or the crankshaft 30 can begin rotating after step 314.

At step 314, the air pressure device 20 applies either a positive pressure or a negative pressure (i.e., vacuum or suction) to the engine intake manifold 58 (e.g., via the throttle body 54). In the example provided, the positive pressure is in the range of 15-40 psi, though other pressures can be used. In one configuration, the pressure is 30 psi, though other pressures can be used. The maximum pressure can be based on the operating range of the manifold pressure sensor 64a or 64b and the maximum operating pressure of the intake manifold 58. In an alternative configuration, not specifically shown, the air pressure device 20 can be connected to the exhaust manifold (e.g., via the turbine of the turbocharger 68) instead of the intake to create pressure or vacuum on the exhaust side of the engine 10.

Returning to the example provided, when the method is used on a variable displacement engine with a cylinder deactivation mode, the method can proceed to step 318 with the crankshaft 30 turning and the pressure or vacuum applied. Alternatively, the method can skip step 318 and proceed to step 322 to test the valve operation under normal operating conditions or to test valve operation of a non-variable displacement engine.

At step 318, the control module 14 cycles the cylinder deactivation mode on and off. The cylinder deactivation mode is cycled in a manner such that the deactivated cylinders are deactivated through one or more strokes in which the valves 42, 46 remain closed when they would otherwise be open during normal operation. For example, the cylinder deactivation mode is on at crankshaft 30 rotational position such that the intake valves 42 are remain closed during an intake stroke and the exhaust valves 46 remain closed during an exhaust stroke. In the example provided, the cycling of the deactivation mode is as follows, though other sequences can be used. First, the engine 10 is operated with the deactivation mode off until the pressure measured by the manifold pressure sensor 64a or 64b reaches a relatively repeatable operating condition. Then, the cylinder deactivation mode is turned on and the engine 10 is operated such that the deactivated cylinder 66 operates through at least four strokes. Then the cylinder deactivation mode is turned off and the engine 10 is operated such that the previously deactivated cylinder 66 operates through at least four strokes. Then the turning on and off of the cylinder deactivation mode and the operation of the engine 10 through the corresponding strokes is repeated as many times as desired. This turning on and off of the cylinder deactivation mode is a "break-in" period configured to allow any premature failures to occur.

After cycling the cylinder deactivation mode a desired amount of times (i.e., for the break-in period), the cylinder deactivation mode is turned back off so that properly functioning valves 42, 46 should open and close as they would during normal operation of the engine 10. In order to test the proper opening of the valves 42, 46, the motor 18 continues to rotate the crankshaft 30 with the cylinder deactivation mode off and the method proceeds to step 322. Alternatively, in order to test the proper closing of the valves 42, 46, the motor 18 continues to rotate the crankshaft 30 with the cylinder deactivation mode on and the method proceeds to step 322. In one example test, the proper opening of the valves 42, 46 is tested (i.e., with cylinder deactivation off), then the proper closing of the valves 42, 46 is tested (i.e., with the cylinder deactivation on), then the proper opening of the valve 42, 46 is tested again, though other procedures can be used.

At step 322, the manifold pressure sensor 64a or 64b measures the pressure of the manifold 58 or 62 and sends signals indicative of the pressure to the control module 14. The method can proceed to step 326 in which the control module 14 compares the measured pressures to a baseline pressure. The control module 14 is configured to determine if the measured pressures are within predetermined tolerances of one or more baseline pressures that represent known operating conditions. In the example provided, the control module 14 compares the measured and baseline pressures as a function of crankshaft 30 rotational position. The baseline pressure is predetermined and can be stored within memory on the control module 14 or external to the control module 14 and accessed by the control module 14. In the example provided, the control module 14 determines the status of the valves 42, 46 at step 326.

Figure 4:
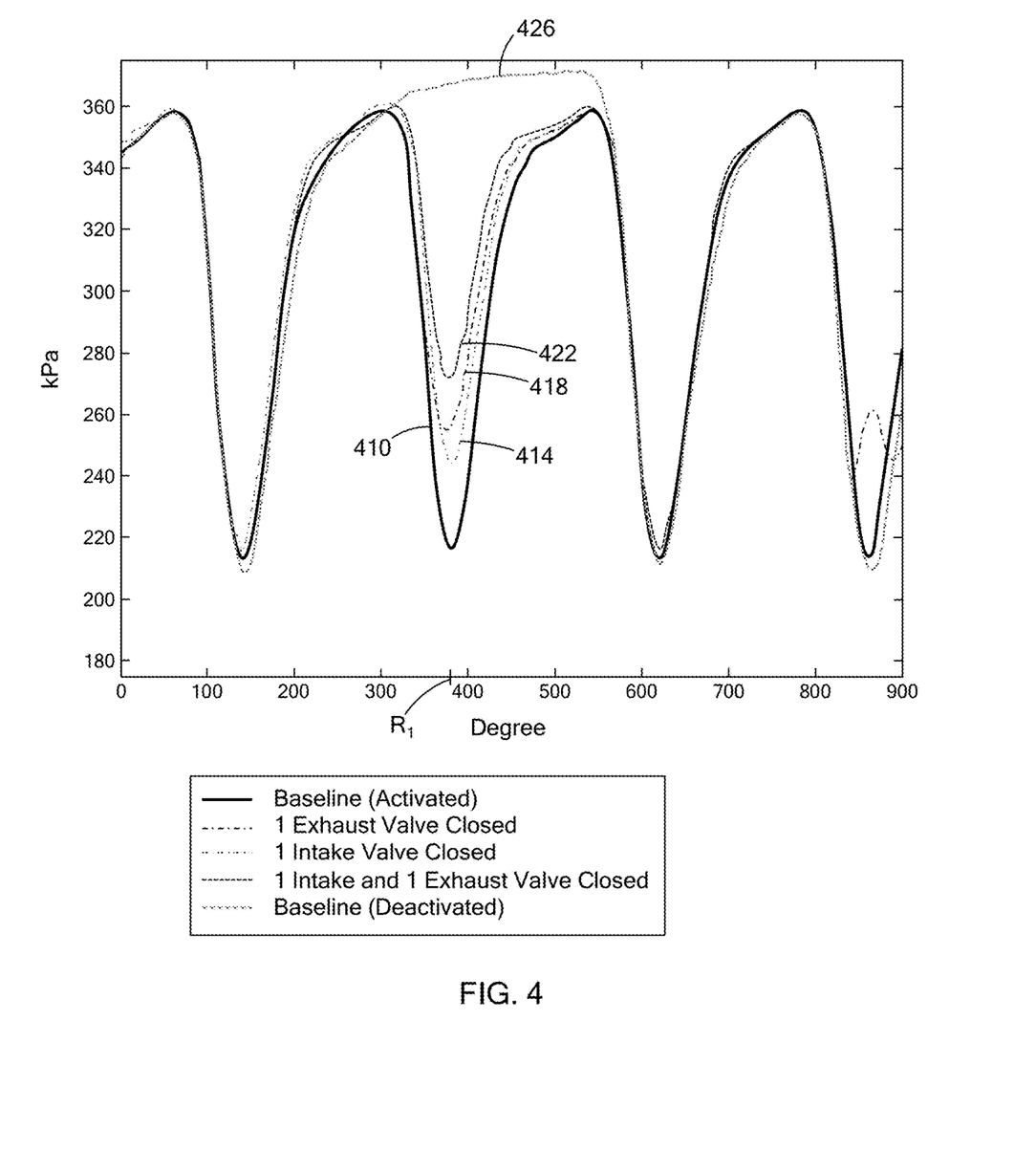
FIG. 4 is a graph of manifold pressure as it relates to crankshaft rotational position while pressurized air is supplied to an intake of the engine of FIG. 2, illustrating manifold pressures for different component conditions.

With additional reference to FIG. 4, a graph of pressure versus crankshaft rotational position illustrating predetermined baselines for five different operating conditions. The graph of FIG. 4 illustrates the conditions when the air pressure device 20 provides air at an elevated pressure to the throttle body 54. Since the open or closed position of the valves 42, 46 can allow or prevent airflow through the engine 10, a variation in the positioning of the valves 42, 46, from an expected position of that valve can be detected based on a change in pressure measured by the manifold pressure sensor 64a, 64b.

Line 410 is a baseline of pressures for the properly operating condition in which the cylinder deactivation mode is off and all valves 42, 46 are properly opening and closing. Line 414 is a baseline of pressures for the defectively operating condition in which one of the intake valves 42 is stuck closed, but the other valves 42, 46 are operating properly. Line 418 is a baseline of pressures for the defectively operating condition in which one of the exhaust valves 46 is stuck closed, but the other valves 42, 46 are operating properly. Line 422 is a baseline of pressures for the defectively operating condition in which one of the intake valves 42 and one of the exhaust valves 46 are stuck closed, the other valves 42, 46 are operating properly. Line 426 is a baseline of pressures for the properly operating condition in which the cylinder deactivation mode is on and all of the intake and exhaust valves 42, 46 are properly closed for the deactivated cylinder 30.

The pressure at the manifold pressure sensor 64a or 64b reaches a minimum, shown on FIG. 4 as a valley in the graphs, at a crankshaft rotational position of approximately $R_1$. In the example provided, $R_1$ is between 300 degrees and 400 degrees, though other configurations can be used. For example, the angular value of $R_1$ can be based on the engine firing order and the specific cylinder being deactivated. The minimum pressure at $R_1$ for the baseline 422 is less than the minimum pressure at $R_1$ for the baseline 426. The minimum pressure at $R_1$ for the baseline 418 is less than the minimum pressure at $R_1$ for the baseline 422. The minimum pressure at $R_1$ for the baseline 414 is less than the minimum pressure at $R_1$ for the baseline 418. The minimum pressure at $R_1$ for the baseline 410 is less than the minimum pressure at $R_1$ for the baseline 414. Accordingly, the control module 14 can determine whether the measured pressure values fall within tolerances of the baselines 410, 414, 418, 422, 426, to determine the generally whether the valves 42, 46 are operating properly for a particular mode, and more specifically which valves are open or closed. It is understood that the baselines can be different from what is shown in FIG. 4 for different test setups (e.g., different engines configurations, or different input pressures from the air pressure device 20). After determining the status of the valves 42, 46, the method proceeds to step 330.

At step 330, the control module 14 can indicate the status of the valves 42, 46. The control module 14 can be configured to output a signal indicative of the result of the test. In other words, the control module 14 can output whether the valves 42, 46 are properly operating, or can output a specific valve malfunction condition indicative of one of the corresponding baseline conditions. The output can be any suitable output that can be observed such as an indicator light, or an output on a display. The output can also be recorded or saved on memory either on the control module 14 or external to the control module 14. While the graph of FIG. 4 is described with reference to positive pressure being applied by the air pressure device 20, a similar method can be used when the air pressure device 20 is a vacuum source connected to either the intake or exhaust side to draw air through the engine 10.

In an alternative configuration, the air pressure device 20 is not a separate device connected to the intake manifold 58 or the exhaust manifold 62. Instead, the air pressure device 20 is the piston 34 of the engine 10. In this configuration, the throttle body 54 is held in a closed position to restrict flow through the throttle body 54 and the motor 18 turns the crankshaft 30 so as to create a vacuum condition within the cylinder 66. In this configuration, the motor 18 can turn the crankshaft 30 at a rotational speed of greater than 1,000 RPM to create the vacuum. In this configuration, the test method can be similar to the method described with reference to FIG. 3, except that the application of vacuum at step 314 occurs as a result of the rotation of the crankshaft 30 at step 310, the throttle body 54 can be in the fully closed position, and the crankshaft can be rotated at a speed greater than 1,000 RPM.

Figure 5:
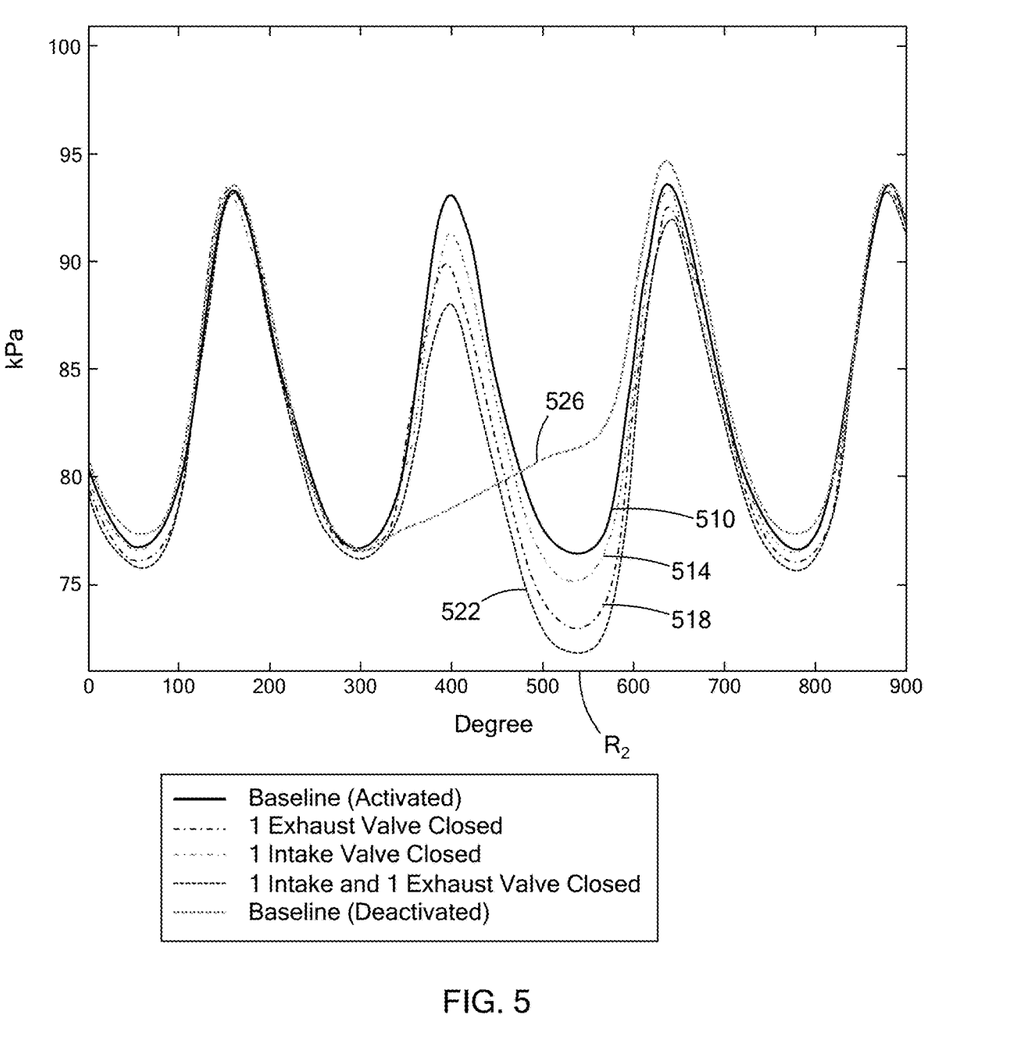
FIG. 5 is a graph of manifold pressure as it relates to crankshaft rotational position while a vacuum is applied to the engine of FIG. 2, illustrating manifold pressures for different component conditions.

With additional reference to FIG. 5, a graph of pressure versus crankshaft rotational position illustrating predetermined baselines for five different operating conditions is shown. The graph of FIG. 5 illustrates the conditions when the air pressure device 20 is the piston 34 and provides a vacuum condition in the cylinder 66. The vacuum condition in the cylinder 66 can apply a vacuum condition in the intake manifold 58 and/or the exhaust manifold 62 when the valves 42, 46 are open. Line 510 is a baseline of pressures for the properly operating condition in which the cylinder deactivation mode is off and all valves 42, 46 are properly opening and closing. Line 514 is a baseline of pressures for the defectively operating condition in which one of the intake valves 42 is stuck closed, but the other valves 42, 46 are operating properly. Line 518 is a baseline of pressures for the defectively operating condition in which one of the exhaust valves 46 is stuck closed, but the other valves 42, 46 are operating properly. Line 522 is a baseline of pressures for the defectively operating condition in which one of the intake valves 42 and one of the exhaust valves 46 are stuck closed, the other valves 42, 46 are operating properly. Line 526 is a baseline of pressures for the properly operating condition in which the cylinder deactivation mode is on and all of the intake and exhaust valves 42, 46 are properly closed for the deactivated cylinder 30.

The pressure at the manifold pressure sensor 64a or 64b reaches a minimum, shown on FIG. 5 as a valley in the graphs, at a crankshaft rotational position of approximately $R_2$. In the example provided, $R_2$ is between 500 degrees and 600 degrees, though other configurations can be used. For example, the angular value of $R_2$ can be based on the engine firing order and the specific cylinder being deactivated. The minimum pressure at $R_2$ for the baseline 510 is less than the minimum pressure at $R_1$ for the baseline 526. The minimum pressure at $R_1$ for the baseline 514 is less than the minimum pressure at $R_1$ for the baseline 510. The minimum pressure at $R_1$ for the baseline 518 is less than the minimum pressure at $R_1$ for the baseline 514. The minimum pressure at $R_1$ for the baseline 522 is less than the minimum pressure at $R_1$ for the baseline 518. Accordingly, the control module 14 can determine whether the measured pressure values fall within tolerances of the baselines 510, 514, 518, 522, 526, to determine the generally whether the valves 42, 46 are operating properly for a particular mode, and more specifically which valves are open or closed. It is understood that the baselines can be different from what is shown in FIG. 5 for different test setups (e.g., different engines configurations, or different input pressures from the air pressure device 20).

While the methods described above are described with reference to determining a condition of the valves 42, 46, the methods can be used to determine a condition of other components of the engine 10. For example, the methods can be used to determine whether there is play between the piston 34 and the cylinder 66, or missing or defective piston rings (not shown). In this test, the method can be similar to the method described above except that step 318 can be omitted and the predetermined baselines that are compared in step 326 to the pressures measured in step 322 can be based on engines having proper or improper sealing between the piston 34 and the cylinder 66. For example, when the piston 34 does not properly seal in the cylinder 66, the pressure can be lower than when there is proper sealing. Similarly, the method can be used to determine a condition of other components that can impact airflow through the engine or compression, such as the turbocharger 68. For example, a turbocharger 68 operating with increased friction (e.g., due to bad bearings or other conditions) can cause restrict airflow from the engine and increase pressure above a baseline. As such, measured pressures can be compared with baseline pressures of known expected conditions to determine proper functioning of the turbocharger 68 or other component.

The description of the disclosure is merely exemplary in nature and, thus, variations that do not depart from the substance of the disclosure are intended to be within the scope of the disclosure. Such variations are not to be regarded as a departure from the spirit and scope of the disclosure.

In this application, including the definitions below, the term "module" or the term "controller" may be replaced with the term "circuit". The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskel, Go, SQL, R, Lisp, Java®, Fortran, Perl, Pascal, Curl, OCaml, Javascript®, HTML5, Ada, Asp (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for", or in the case of a method claim using the phrases "operation for" or "step for".

What is claimed is:

1. A method of determining valve positions for an engine having an air pressure sensor, the method comprising:
    performing a cold test, the cold test including:
        operating an electric motor that is drivingly coupled to a crankshaft of the engine such that the crankshaft is rotated by the electric motor;
        providing either pressurized air or vacuum to the engine via a source of pressurized air or vacuum, the source being connected to either an air intake manifold of the engine or an exhaust manifold of the engine, the pressurized air or vacuum being provided to the engine via the air intake manifold or the exhaust manifold while the crankshaft is rotated by the electric motor;
        cycling a cylinder deactivation mode of the engine between an on condition and an off condition at least once while the crankshaft is rotated by the electric motor; and
        measuring intake or exhaust pressures with the pressure sensor as a function of crankshaft rotational position while the crankshaft is rotated by the electric motor;
    comparing the pressures with predetermined baseline pressures for crankshaft rotational positions; and
    indicating valve positions based on the comparison of the pressures with the baseline pressures for crankshaft rotational positions.

2. The method according to claim 1, wherein the valve positions are open or closed and the method further comprises indicating which valves among a plurality of valves of the engine are either open or closed.

3. The method according to claim 2, wherein an open valve position is indicated when the measured pressure is different than the baseline pressure at a known crankshaft rotation angle.

4. The method according to claim 2, wherein a closed valve position or stuck valve position is indicated when the measured pressure is different than the baseline pressure at a known crankshaft rotation angle.

5. The method according to claim 2, wherein an open valve position is indicated when the measured pressure is within predetermined tolerances of the baseline pressure at a known crankshaft rotation angle.

6. The method according to claim 2, wherein a closed valve position or stuck valve position is indicated when the measured pressure is within predetermined tolerances of the baseline pressure at a known crankshaft rotation angle.

7. The method according to claim 1, wherein each cylinder of the engine has 2 intake valves and 2 exhaust valves and the step of indicating the valve positions includes indicating open or closed positions of one or both of the intake valves or one or both of the exhaust valves.

8. The method according to claim 1, wherein the source is connected to the air intake manifold via an electronic throttle body (ETB) and the method comprises providing the pressurized air from the source to the air intake manifold via the ETB.

9. The method according to claim 1 further comprising:
    opening a throttle body to a wide open throttle condition during the cold test, the throttle body being connected to the air intake manifold; and
    operating an intake variable cam timing (VCT) and an exhaust VCT in a maximum valve overlap condition during the cold test.

10. The method according to claim 1, wherein a revolutions per minute (RPM) of the engine is 1000 RPM or less.

11. The method according to claim 1, wherein the source provides the pressurized air to the engine at 40 psi or less.

12. The method according to claim 1 further comprising indicating a proper or improper operation of the cylinder deactivation mode based on variations in pressure between the measured pressures and the baseline pressures for crankshaft rotational positions.

13. A method of determining a condition of a component of an engine having an air pressure sensor during a cold test comprising:
    opening a throttle body to a wide open throttle position;
    setting an intake variable cam timing (VCT) and an exhaust VCT to a maximum valve overlap condition;
    operating a rotary power source that is drivingly coupled to a crankshaft of the engine such that the rotary power source rotates the crankshaft, wherein the rotary power source does not receive power from combustion within the engine;
    providing either pressurized air or vacuum to the engine via a source of pressurized air or vacuum while the crankshaft is rotated by the rotary power source, the source being connected to either the throttle body or an exhaust of the engine;
    measuring pressures with the pressure sensor as a function of crankshaft rotational position while the crankshaft is rotated by the rotary power source;
    comparing the pressures with predetermined baseline pressures for crankshaft rotational positions; and
    indicating a condition of the component based on the comparison of the pressures with the baseline pressures for crankshaft rotational positions.

14. The method according to claim 13, wherein the component is a valve and the condition is one of open or closed.

15. The method according to claim 13, wherein the component is a piston slidably disposed in a cylinder and the condition is play between the piston and the cylinder.

16. The method according to claim 13, wherein the component is a turbocharger.

17. The method according to claim 13, wherein the source is operatively connected to the throttle body to provide the pressurized air to the intake of the engine.

18. A method of determining a condition of a turbocharger of an engine during a cold test, wherein the turbocharger is connected to an exhaust of the engine, the method comprising:
    rotating a crankshaft of the engine by operating an electric motor drivingly coupled to the crankshaft;
    providing either pressurized air or vacuum to the engine via a source of pressurized air or vacuum, the source being connected to either an air intake of the engine or an exhaust of the engine, the pressurized air or vacuum being provided to the engine while the crankshaft is rotated by the electric motor;
    measuring pressures with a pressure sensor as a function of crankshaft rotational position while the crankshaft is rotated by the electric motor, the pressure sensor being upstream of the turbocharger;
    comparing the pressures as a function of crankshaft position with predetermined baseline pressures for crankshaft positions; and
    indicating a condition of the turbocharger based on the comparison of the pressures as a function of crankshaft position with the baseline pressures for crankshaft positions.

19. The method according to claim 1, wherein measuring intake or exhaust pressures as a function of crankshaft rotational position includes measuring pressures while the cylinder deactivation mode is off and the baseline pressures for crankshaft rotational positions are baseline pressures for the cylinder deactivation mode being off.

20. The method according to claim 1, wherein measuring intake or exhaust pressures as a function of crankshaft rotational position includes measuring pressures while the cylinder deactivation mode is on and the baseline pressures for crankshaft rotational positions are baseline pressures for the cylinder deactivation mode being on.

21. The method according to claim 1, wherein the pressurized air or vacuum is provided to the air intake manifold or the exhaust manifold while the crankshaft is rotated by the electric motor through an intake stroke, a compression stroke, a power stroke, and an exhaust stroke of each cylinder of the engine.

22. The method according to claim 1, wherein the source is connected to the intake manifold such that the pressurized air or vacuum is provided to the intake manifold while the crankshaft is rotated by the electric motor through a series of intake, compression, power, and exhaust strokes for each cylinder of the engine.

* * * * *